United States Patent
Ogawa et al.

(10) Patent No.: US 6,373,616 B1
(45) Date of Patent: Apr. 16, 2002

(54) OPTICAL MODULATION DEVICE AND PROJECTOR

(75) Inventors: Yasunori Ogawa, Suwa; Nobuo Watanabe, Shiojiri; Hiromi Saito, Chino; Shigeo Toda, Nagano, all of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/297,370

(22) PCT Filed: Sep. 11, 1998

(86) PCT No.: PCT/JP98/04130

§ 371 Date: May 11, 1999

§ 102(e) Date: May 11, 1999

(87) PCT Pub. No.: WO99/13375

PCT Pub. Date: Mar. 18, 1999

(30) Foreign Application Priority Data

Sep. 11, 1997 (JP) .............................................. 9-247299
Feb. 13, 1998 (JP) ............................................ 10-031592
Sep. 8, 1998 (JP) ............................................ 10-254413

(51) Int. Cl.⁷ .......................... G02F 1/03; G02F 1/1333
(52) U.S. Cl. ........................ 359/245; 349/110; 349/153
(58) Field of Search ................................ 359/237, 245; 257/678, 727, 730; 349/153, 110, 154

(56) References Cited

U.S. PATENT DOCUMENTS

| | | | |
|---|---|---|---|
| 4,908,876 A | * | 3/1990 | DeForest et al. ............. 382/54 |
| 5,739,880 A | * | 4/1998 | Suzuki et al. ................ 349/110 |
| 5,870,160 A | * | 2/1999 | Yanagawa et al. .......... 349/141 |

FOREIGN PATENT DOCUMENTS

| | | |
|---|---|---|
| JP | A-54-12596 | 1/1979 |
| JP | U-62-118267 | 7/1987 |
| JP | U-63-132923 | 8/1988 |

* cited by examiner

*Primary Examiner*—Huy Mai
(74) *Attorney, Agent, or Firm*—Oliff & Berridge, PLC

(57) ABSTRACT

An optical modulation device is presented having a distance Wp from the end of an opposite substrate to the inner peripheral edge of a cover portion in a frame being set to be smaller than the distance W1 from the end of the opposite substrate to the inner peripheral edge of a first light-shielding portion (Wp<W1). Therefore, there is no fear that incident light from outside of the inner peripheral edge of the cover portion may be blocked by the cover portion, so that incident light may reliably enter the entire image area. This arrangement makes it possible to prevent the peripheral portion of a projection image from becoming dark, and thereby improve the quality of the projection image.

12 Claims, 8 Drawing Sheets

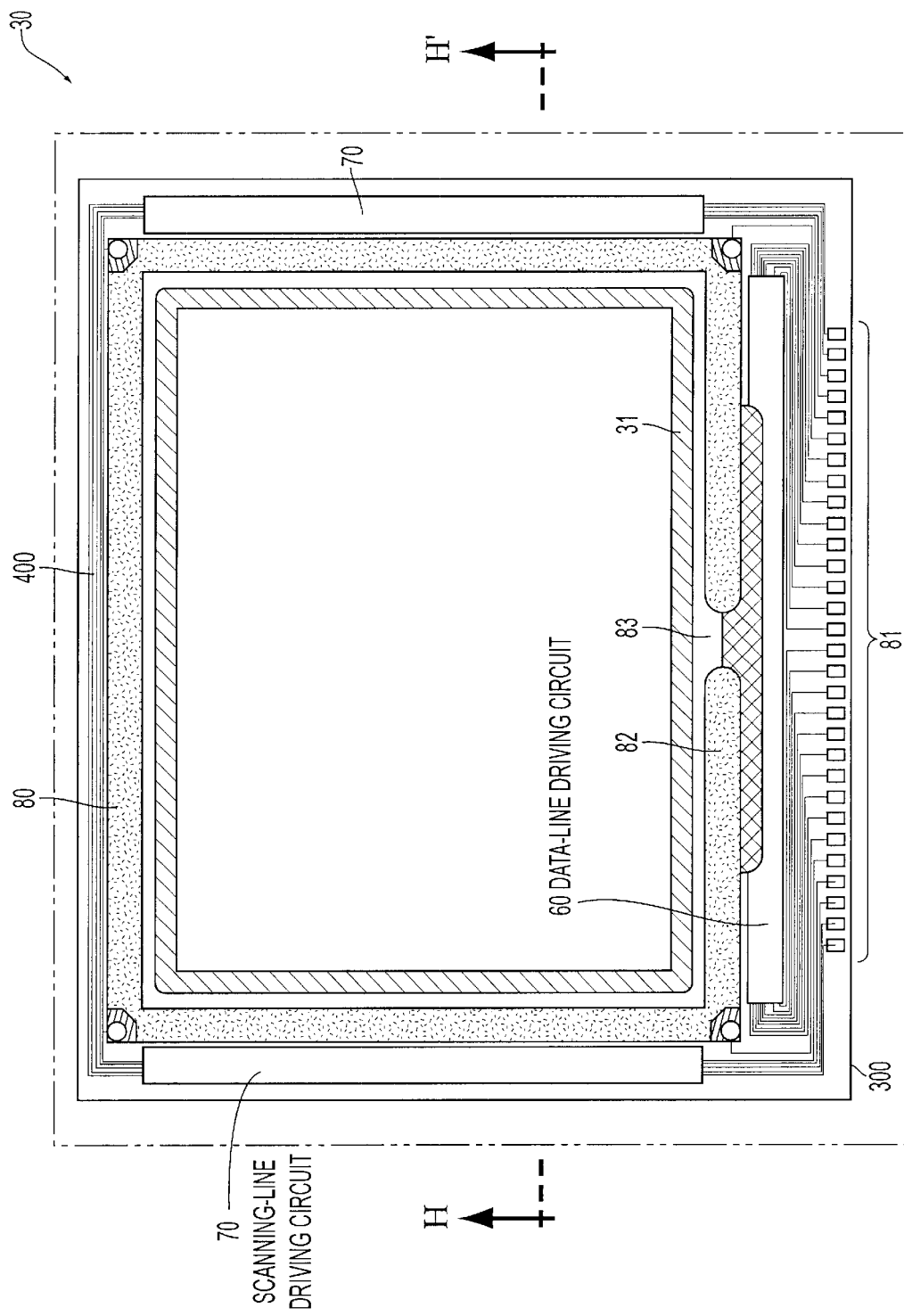

SECTION B ENLARGED

OPTICAL MODULATION DEVICE AND PROJECTOR

BACKGROUND OF THE INVENTION

1. Field of the Invention

The present invention relates to an optical modulation device having an electrooptical device, such as a liquid crystal panel, and to a projection display device using this optical modulation device.

2. Description of the Related Art

A liquid crystal panel that serves as an electrooptical device for use in a projection display device generally comprises an active matrix substrate having pixel electrodes and pixel switching elements, an opposite substrate having opposite electrodes, and liquid crystal interposed between the active matrix substrate and the opposite substrate. The liquid crystal is filled in a region partitioned by a sealing layer out of the space between the active matrix substrate and the opposite substrate, and the alignment state thereof is controlled pixel by pixel between the active matrix substrate and the opposite substrate.

Therefore, in a projection display device using the liquid crystal panel having such a structure as an optical modulation device, light emitted from a light source is collected and guided to the liquid crystal panel by a light-collecting optical system, and this light is optically modulated by the liquid crystal, whereby a predetermined image is enlarged and projected onto a projection plane, such as a screen, by a projection lens.

The liquid crystal panel structured as mentioned above is usually held by a light-shielding holding member having an open portion corresponding to an image area. In general, the image area is outlined by a light shielding portion of Cr (chrome) that is formed between the active matrix substrate and the opposite substrate to define the periphery.

On the light-incident side of the liquid crystal panel, however, since a cover portion that forms a peripheral edge of the open portion of the holding member faces the light-incident surface of the liquid crystal panel (opposite substrate) and overlaps with the light-shielding portion in a planar manner, light that is incident from the outside of the inner peripheral edge of the cover portion is blocked by the cover portion depending on the incident angle. Therefore, the peripheral portion of a projection image becomes dark, and this may deteriorate the quality of the projection image.

SUMMARY OF THE INVENTION

An object of the present invention is to provide an optical modulation device that is able to improve the quality of a projection image, and a projection display device using this optical modulation device.

An optical modulation device of the present invention includes an electrooptical device having a first light-transmissive substrate disposed on the light-incident side, a second light-transmissive substrate disposed on the light-emitting side, liquid crystal interposed between opposing surfaces of these first and second light-transmissive substrates, and a driving circuit disposed at the peripheral edge of a light-incident surface of the second light-transmissive substrate, and a holding member for holding the electrooptical device, wherein a first light-shielding portion for defining an image area is formed between the first and second light-transmissive substrates in the electrooptical device, a cover portion for covering the peripheral edge of a light-incident surface of the first light-transmissive substrate is formed in the holding member, and Wp and W1 are set in a relationship that is expressed by the following equation (1):

$$Wp < W1 \qquad (1)$$

where Wp is the distance from the end of the first light-transmissive substrate to the inner peripheral edge of the cover portion in the holding member, and W1 is the distance from the end of the first light-transmissive substrate to the inner peripheral edge of the first light-shielding portion.

Herein, "the inner peripheral edge of the cover portion" means a part of the cover portion that projects toward the image area to the largest degree and that is most apart from the light-incident surface of the first light-transmissive substrate. Furthermore, "the distance from the end of the first light-transmissive substrate" means the distance along the in-plane direction of the first light-transmissive substrate.

In the present invention configured like this, since the distance Wp from the end of the first light-transmissive substrate to the inner peripheral edge of the cover portion is set to be smaller than the distance W1 from the end of the first light-transmissive substrate to the inner peripheral edge of the first light-shielding portion, there is no fear that the inner peripheral edge of the cover portion may project into the image area beyond the first light-shielding portion. Since incident light that is incident from the outside of the inner peripheral edge of the cover portion reliably enters the entire image area without being blocked by the cover portion, the peripheral portion of a projection image does not become dark, and the quality of the projection image is thereby improved.

In the optical modulation device of the present invention, when the incident angle of incident light, which is incident from the inside of the inner peripheral edge of the cover portion, of light that is incident on the electrooptical device, is $\theta i$, the incident angle of incident light, which is incident from the outside of the inner peripheral edge of the cover portion, is $\theta o$, the distance from the inner peripheral edge of the cover portion to the light-incident surface of the first light-transmissive substrate is dp, the thickness of the first light-transmissive substrate is d1, the distance from the end of the first light-transmissive substrate to the outer peripheral edge of the first light-shielding portion is W1', and the refractive index of the first light-transmissive substrate is n1, it is preferable to set Wp, W1, and W1' in a relationship expressed by the following equation (2).

$$W1' + dp\tan\theta i + d1\frac{\sin\theta i}{\sqrt{n1^2 - \sin^2\theta i}} \le \qquad (2)$$

$$Wp \le W1 - dp\tan\theta o - d1\frac{\sin\theta o}{\sqrt{n1^2 - \sin^2\theta o}}$$

When the first light-transmissive substrate and the second light-transmissive substrate are bonded with a sealing material of an ultraviolet-curing type, there is a need to leave a light-transmissive portion of the first light-transmissive substrate outside the first light-shielding portion. Since the first light-transmissive substrate has the thickness d1, incident light that is incident from the inside of the inner peripheral edge of the cover portion is, in some cases, not entirely blocked by the cover portion of the holding member according to the incident angle, passes through the light-transmissive portion of the first light-transmissive substrate, and leaks from the outer peripheral edge of the first light-shielding portion. For this reason, the leaking incident light impinges on a driving circuit that is disposed on the periphery of the second light-transmissive substrate, thereby causing a malfunction of the driving circuit. When the distance Wp is set within the range given by the equation (2), however, there is no fear that the quality of a projection image may be deteriorated by incident light that is incident from the outside at the incident angle θo. Moreover, there is no fear that incident light incident from the inside at the incident angle θi may leak from the outer peripheral edge of the first light-shielding portion, and that the light may be applied onto the driving circuit disposed on the periphery of the second light-transmissive substrate. Therefore, even when a light-transmissive portion is formed outside the first light-shielding portion, the driving circuit is prevented from malfunctioning.

Furthermore, in the optical modulation device of the present invention, it is preferable to form a third light-transmissive substrate between the first light-transmissive substrate and the cover portion. Furthermore, when the incident angle of incident light incident from the inside of the inner peripheral edge of the cover portion, of light incident on the electrooptical device, is θi, the incident angle of incident light incident from the outside of the inner peripheral edge of the cover portion is θo, the distance from the inner peripheral edge of the cover portion to a light-incident surface of the third light-transmissive substrate is dp', the thickness of the first light-transmissive substrate is d1, the thickness of the third light-transmissive substrate is d2, the distance from the end of the first light-transmissive substrate to the outer peripheral edge of the first light-shielding portion is W1', and the refractive indices of the first light-transmissive substrate and the third light-transmissive substrate are n1 and n2 respectively, it is preferable to set Wp, W1, and W1' in a relationship expressed by the following equation (3).

$$W1' + dp'\tan\theta i + d1\frac{\sin\theta i}{\sqrt{n1^2 - \sin^2\theta i}} + d2\frac{\sin\theta i}{\sqrt{n2^2 - \sin^2\theta i}} \leq Wp \leq \quad (3)$$

$$W1 - dp'\tan\theta o - d1\frac{\sin\theta o}{\sqrt{n1^2 - \sin^2\theta o}} - d2\frac{\sin\theta o}{\sqrt{n2^2 - \sin^2\theta o}}$$

In such a case, the third light-transmissive substrate serves as a dustproof light-transmissive substrate, so that the light-incident surface of the first light-transmissive substrate is protected from dust and flaws, and there is no fear that such dust and flaws will be enlarged in projection.

In this case, it is preferable to form a second light-shielding portion between the third light-transmissive substrate and the first light-transmissive substrate and to set Wp, W1, and W2 in a relationship expressed by the following equation (4):

$$Wp < W2 < W1 \quad (4)$$

where W2 is the distance from the end of the first light-transmissive substrate to the inner peripheral edge of the second light-shielding portion.

In such a case, since the second light-shielding portion is formed between the first light-transmissive substrate and the third light-transmissive substrate and the distance W2 from the end of the first light-transmissive substrate to the inner peripheral edge of the second light-shielding portion is set within the range given by the equation (4), light that is incident from the inside and passes through the inner peripheral edge of the cover portion is blocked by the second light-shielding portion. Therefore, in the case of the first light-shielding portion, there is no need to consider such incident light. Regarding light that is incident from the inside, consideration should be given to incident light that passes through the inner peripheral edge of the second light-shielding portion, so that the distance W1' from the end of the first light-transmissive substrate to the outer peripheral edge of the first light-shielding portion is set to be larger.

When the distance from the end of the first light-transmissive substrate to the outer peripheral edge of the second light-shielding portion is W2', Wp, W1, W1', W2, and W2' may be set in a relationship expressed by the following equations (5) and (6).

$$W2' + dp'\tan\theta i + d2\frac{\sin\theta i}{\sqrt{n2^2 - \sin^2\theta i}} \leq \quad (5)$$

$$Wp \leq W2 - dp'\tan\theta o - d2\frac{\sin\theta o}{\sqrt{n2^2 - \sin^2\theta o}}$$

$$W1' + d1\frac{\sin\theta i}{\sqrt{n1^2 - \sin^2\theta i}} \leq W2 \leq W1 - d1\frac{\sin\theta o}{\sqrt{n1^2 - \sin^2\theta o}} \quad (6)$$

In such a case, the distance W2' from the end of the first light-transmissive substrate to the outer peripheral edge of the second light-shielding portion can be set based on a positional relationship to the distance Wp of the cover portion so that light incident from the inside does not leak from the outer peripheral edge of the second light-shielding portion. Therefore, under certain circumstances, the second light-shielding portion may be formed over a wide area from the end of the first light-transmissive substrate by setting W2' to be at zero, whereby the incident light from the inside is less prone to leak toward the driving circuit.

When an air layer having a thickness d3 is formed between the first light-transmissive substrate and the third light-transmissive substrate, and a second light-shielding portion is formed on the light-emitting surface of the third light-transmissive substrate, it is preferable to set Wp, W1, W1', W2, and W2' in a relationship expressed by the following equations (7) and (8).

$$W2' + dp'\tan\theta i + d2\frac{\sin\theta i}{\sqrt{n2^2 - \sin^2\theta i}} \leq \quad (7)$$

$$Wp \leq W2 - dp'\tan\theta o - d2\frac{\sin\theta o}{\sqrt{n2^2 - \sin^2\theta o}}$$

$$W1' + d1\frac{\sin\theta i}{\sqrt{n1^2 - \sin^2\theta i}} + d3\tan\theta i \leq \quad (8)$$

$$W2 \leq W1 - d1\frac{\sin\theta o}{\sqrt{n1^2 - \sin^2\theta o}} - d3\tan\theta o$$

In such a case, since the air layer is formed between the first light-transmissive substrate and the third light-transmissive substrate, heat that is generated in the third light-transmissive substrate is less prone to be transmitted toward the electrooptical device, compared with a case in which the air layer is not formed.

In contrast, when the second light-shielding portion is formed on the light-incident surface of the first light-transmissive substrate, it is preferable to set Wp, W1, W1', W2, and W2' in a relationship expressed by the following equations (9) and (10).

$$W2' + (dp' + d3)\tan\theta i + d2\frac{\sin\theta i}{\sqrt{n2^2 - \sin^2\theta i}} \leq \qquad (9)$$

$$Wp \leq W2 - (dp' + d3)\tan\theta o - d2\frac{\sin\theta o}{\sqrt{n2^2 - \sin^2\theta o}}$$

$$W1' + d1\frac{\sin\theta i}{\sqrt{n1^2 - \sin^2\theta i}} \leq W2 \leq W1 - d1\frac{\sin\theta o}{\sqrt{n1^2 - \sin^2\theta o}} \qquad (10)$$

In this case, the aforesaid effect produced by forming the air layer is also obtained.

On the other hand, a projection display device of the present invention includes a light source, the optical modulation device mentioned above, and a projection lens for projecting light modulated by the optical modulation device. It is possible to provide a projection display device in which the above-mentioned effects are similarly obtained.

BRIEF DESCRIPTION OF THE DRAWINGS

FIG. 3 is a plan view of an electrooptical device that constitutes the optical modulation device.

DESCRIPTION OF THE PREFERRED EMBODIMENTS

Embodiments of the present invention will be described below with reference to the drawings.

1. First Embodiment

A. Structure of Principal Part of Projection Display Device

A projection display device according to this embodiment of the present invention is of a type that separates a light beam emitted from a light source into color beams of red R, green G, and blue B, modulates these color beams by liquid crystal light valves according to image information, synthesizes the modulated color beams, and magnifies and displays the synthesized beams onto a screen via a projection lens.

Figure 1:
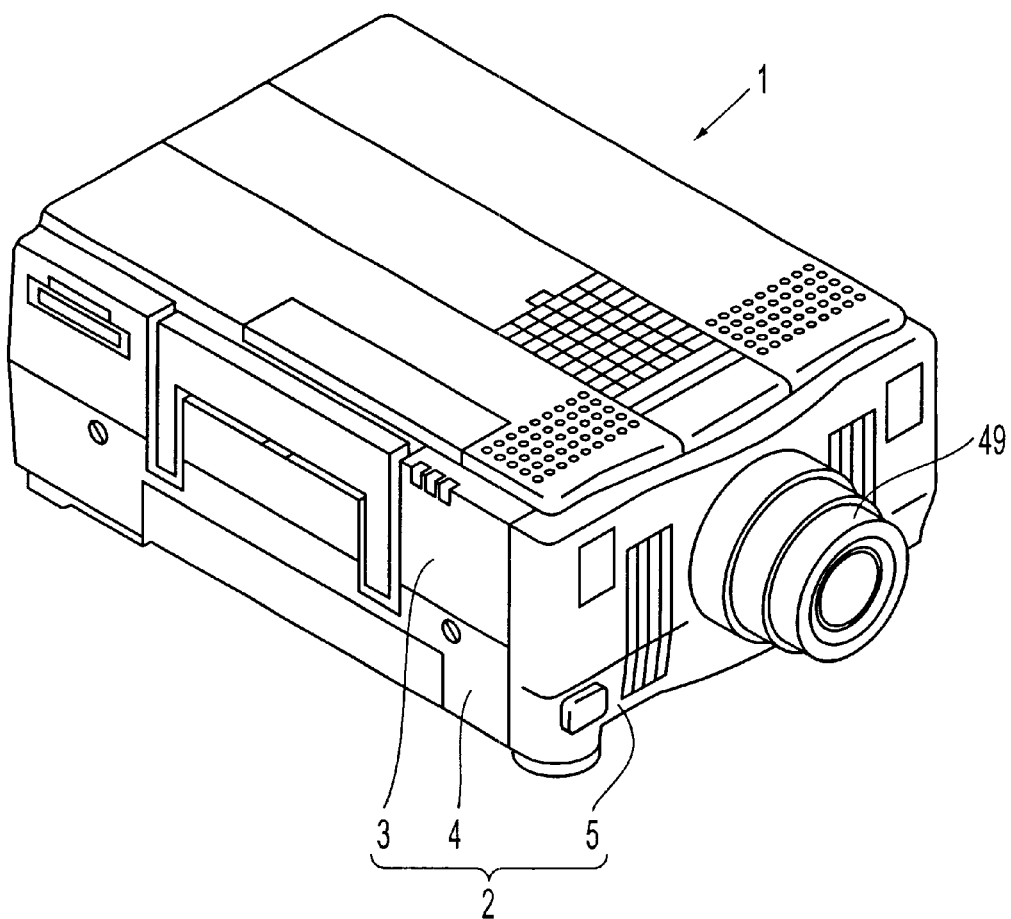
FIG. 1 is a perspective view showing the external appearance of a projection display device that is equipped with an optical modulation device according to a first embodiment of the present invention.

FIG. 1 shows the external appearance of a projection display device 1 of such a type. As shown in this figure, the projection display device 1 has an outer casing 2 shaped like a rectangular parallelepiped. The outer casing 2 is basically composed of an upper casing 3, a lower casing 4, and a front casing 5 that defines the front surface of the device. A leading portion of a projection lens unit 49 projects from the center of the front casing 5.

Figure 2:
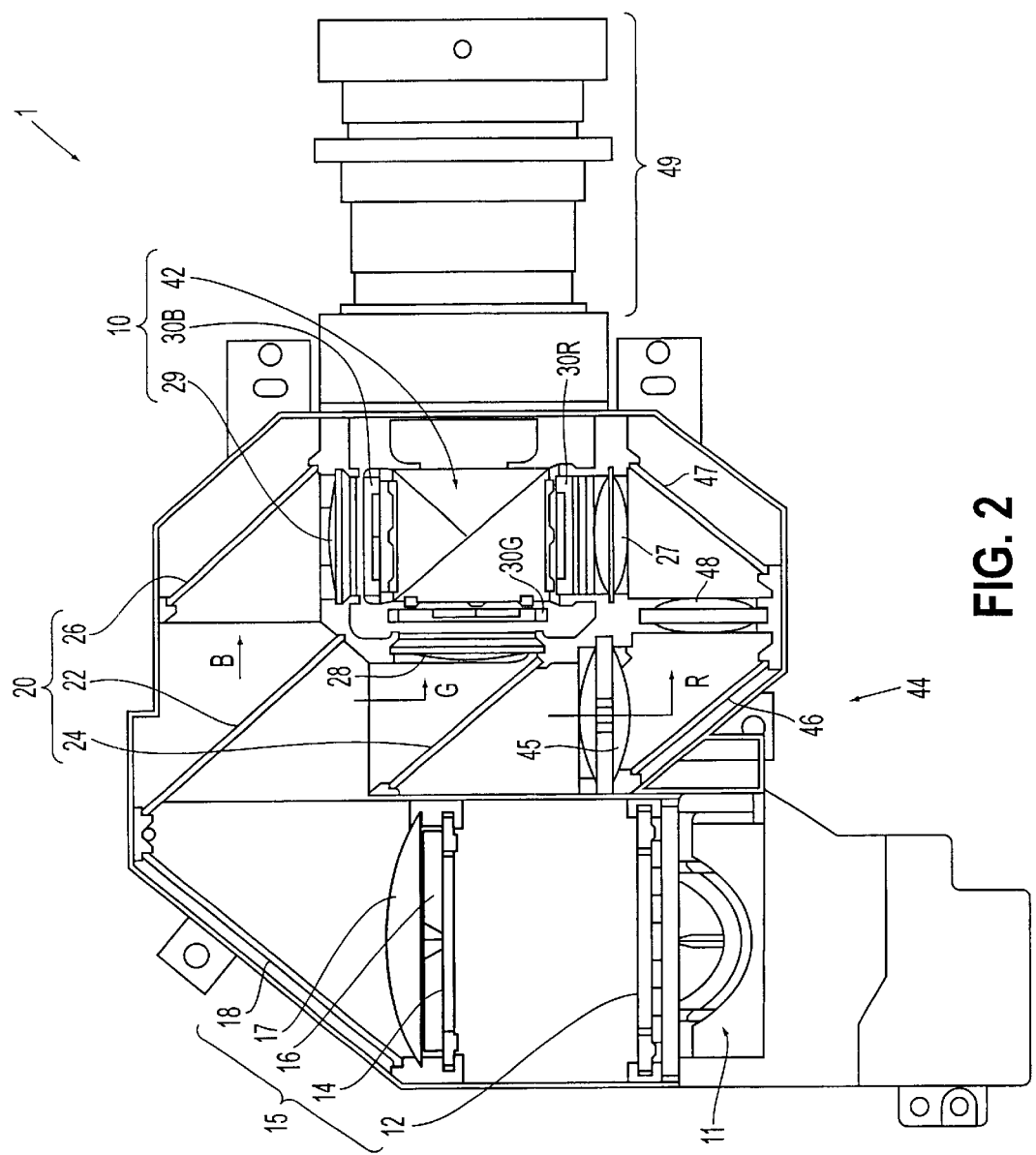
FIG. 2 is a plan view of an optical system in the projection display device.

Inside such an outer casing 2 of the projection display device 1, an optical unit 10 shown in FIG. 2 is mounted.

This optical unit 10 generally comprises an illumination optical system 15 for emitting illumination light, a color separation optical system 20 for separating a light beam emitted from the illumination optical system 15 into color beams R, G, and B of red, green, and blue, three liquid crystal light valves 30R, 30G, and 30B for modulating the color beams, a prism unit 42 formed of a dichroic prism that serves as a color synthesizing optical system for synthesizing the modulated color beams, and the projection lens unit 49 for magnifying and projecting the synthesized beams onto a screen.

The illumination optical system 15 includes a light-source lamp 11, two lens plates 12 and 14, a polarization conversion element 16, a superimposing lens 17, and a reflecting mirror 18.

Used as the light-source lamp 11 are a halogen lamp, a metal halide lamp, a xenon lamp, and the like.

The first lens plate 12 has a plurality of small lenses. A light beam emitted from the light-source lamp 11 is separated into a plurality of partial beams by these small lenses. Then, the partial beams are superimposed onto the liquid crystal light valves 30R, 30G, and 30B via the superimposing lens 17. Therefore, the liquid crystal light valves 30R, 30G, and 30B are illuminated at almost uniform illuminance.

The second lens plate 14 has a plurality of small lenses, similar to the first lens plate 12. The center optical paths of the partial beams emitted from the first lens plate 12 are aligned in parallel with the light-source optical axis by these small lenses. When a light beam emitted from the light-source lamp 11 is light that is parallel to the light-source optical axis, the center optical path of a partial beam emitted from the first lens plate 12 is also in parallel with the light-source optical axis. Therefore, when light beams emitted from the light-source lamp 11 have high parallelism, the second lens plate 14 may be omitted.

The polarization conversion element 16 includes a polarization beam separation element, in which a plurality of polarization beam separation films and a plurality of reflecting films are alternately arranged nearly in parallel, and a half-wave plate (not shown). Light, which is collected on the polarization beam separation films via the small lenses in the first lens plate 12 and the second lens plate 14, is separated into p-polarized light and s-polarized light. P-polarized light that has passed through the polarization beam separation film is converted into s-polarized light by the half-wave plate. On the other hand, s-polarized light that has been reflected by the polarization beam separation film is reflected by the reflecting film, and emitted in almost the same direction as that of the light that has been converted into s-polarized light. That is, light emitted from the light-source lamp 11 and polarized in random directions is unified into one type of polarized light by the polarization conversion element 16.

The superimposing lens 17 superimposes, on the liquid crystal light valves 30R, 30G, and 30B, a plurality of partial beams that are separated by the first lens plate 12 and then unified into one type of polarized light by the polarization conversion element 16.

The reflecting mirror 18 bends the optical path of illumination light toward the front of the device.

In the color separation optical system 20, a red and green reflecting dichroic mirror 22, a green reflecting dichroic mirror 24, and a reflecting mirror 26 are arranged. Out of the light beams emitted from the illumination optical system 15, via illumination optical system 15, firstly a red beam R and a green beam G are perpendicularly reflected by the red and green reflecting dichroic mirror 22, and travel toward the green reflecting dichroic mirror 24. A blue beam B passes through this red and green reflecting dichroic mirror 22, and then is perpendicularly reflected by the reflecting mirror 26 disposed behind, and emerges from an emitting portion for the blue beam toward the prism unit 42. Next, only the green beam G of the red and green beams R and G that have been reflected by the red and green reflecting dichroic mirror 22 is perpendicularly reflected by the green reflecting dichroic mirror 24, and emitted from an emitting portion for the green light toward the prism unit 42. Furthermore, the red beam R that has passed through the green reflecting dichroic mirror 24 is emitted from an emitting portion for the red beam toward a light guide system 44. Light-collecting lenses 45, 28, and 29 are disposed on the emitting sides of the color separation optical system 20 for the color beams.

The blue and green beams B and G collected by the light-collecting lenses 28 and 29 enter the liquid crystal light valves 30B and 30G, where they are modulated and given image information corresponding thereto. That is, these liquid crystal light valves 30R and 30G are subjected to switching control according to image information by a driving system that is not shown, so that the color beams passing therethrough are modulated. As such a driving system, a known type of system may be used unchanged.

On the other hand, the red beam R is guided to the liquid crystal light valve 30R via the light guide system 44, where it undergoes similar modulation according to image information. The light guide system 44 includes an incident-side light-collecting lens 45, an incident-side reflecting mirror 46, an emitting-side reflecting mirror 47, an intermediate lens 48 interposed therebetween, and an emitting-side light-collecting lens, and has a function of avoiding light loss of red light in the optical path. As the liquid crystal light valves 30R, 30B, and 30G in this embodiment, for example, liquid crystal light valves using a polysilicon TFT as a switching element may be used.

The color beams modulated through the liquid crystal light valves 30R, 30G, and 30B enter the prism unit 42, where they are synthesized. The resynthesized color image is magnified and projected onto a screen, disposed at a predetermined position, via the projection lens unit 49.

B. Structure of Optical Modulation Device

Figure 4A:
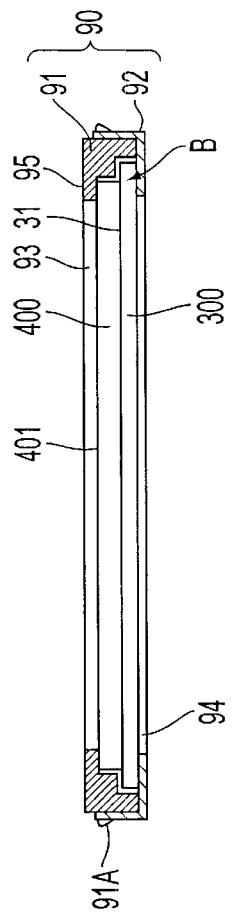
FIG. 4A is a cross-sectional view taken along line H–H' in FIG. 3.
Figure 4B:
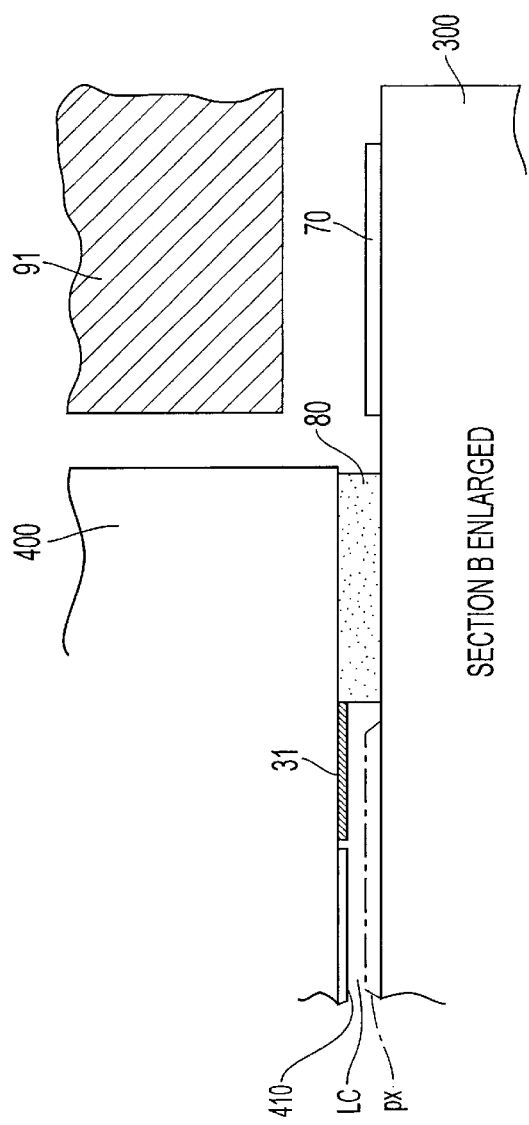
FIG. 4B is an enlarged view showing the principal part of FIG. 4A.

These liquid crystal light valves 30R, 30G, and 30B have a combination of an optical modulation device 50 shown in FIGS. 3 and 4A–B, which includes a liquid crystal panel 30 serving as an electrooptical device and a holding member 90 (shown by a double-dotted chain line in FIG. 3) for holding the liquid crystal panel 30, and polarizers disposed on both sides of the liquid crystal panel 30, which are not shown.

In FIGS. 3 and 4A–B, the liquid crystal panel 30 in the optical modulation device 50 includes an active matrix substrate 300 (second light-transmissive substrate), and a opposite substrate 400 (first light-transmissive substrate) having a opposite electrode 31. The active matrix substrate 300 and the opposite substrate 400 are bonded with a predetermined spacing (cell gap) therebetween with a sealing material 80 containing a gap-forming material, and the space between these substrates contains liquid crystal LC that serves as an electrooptical substance and is sealed up. As the sealing material 80, various kinds of ultraviolet-curing resins may be used. As the gap-forming material, inorganic or organic fibers or spheres of about $2\,\mu$m to $10\,\mu$m may be used.

The opposite substrate 400 is smaller than the active matrix substrate 300, and is bonded so that the peripheral portion of the active matrix substrate 300 appears outside the outer peripheral edge of the opposite substrate 400. A data-line driving circuit 60 and scanning-line driving circuits 70 that are composed of long and narrow bare chip ICs (driver ICs) and input and output terminals 81 of the active matrix substrate 300 are mounted on the light-incident side of the peripheral portion. A flexible printed wire board (not shown) is electrically connected to the input and output terminals 81 of these circuits 60 and 70 that are positioned outside the opposite substrate 400.

The sealing material 80 is partially discontinuous, and this discontinuous portion forms a liquid crystal injection port 83. For this reason, when the pressure of a inside region of the sealing material 80 is reduced after the opposite substrate 400 and the active matrix substrate 300 are bonded to each other, the liquid crystal LC can be injected from the liquid crystal injection port 83 at a reduced pressure. After the liquid crystal LC is sealed therein, the liquid crystal injection port 83 is closed with a sealant 82. On the opposite substrate 400, a first light-shielding portion 31 is formed at the inside of the sealing material 80 (inside in the in-plane direction). This first light-shielding portion 31 defines an image area on the liquid crystal panel 30.

Figure 5A:
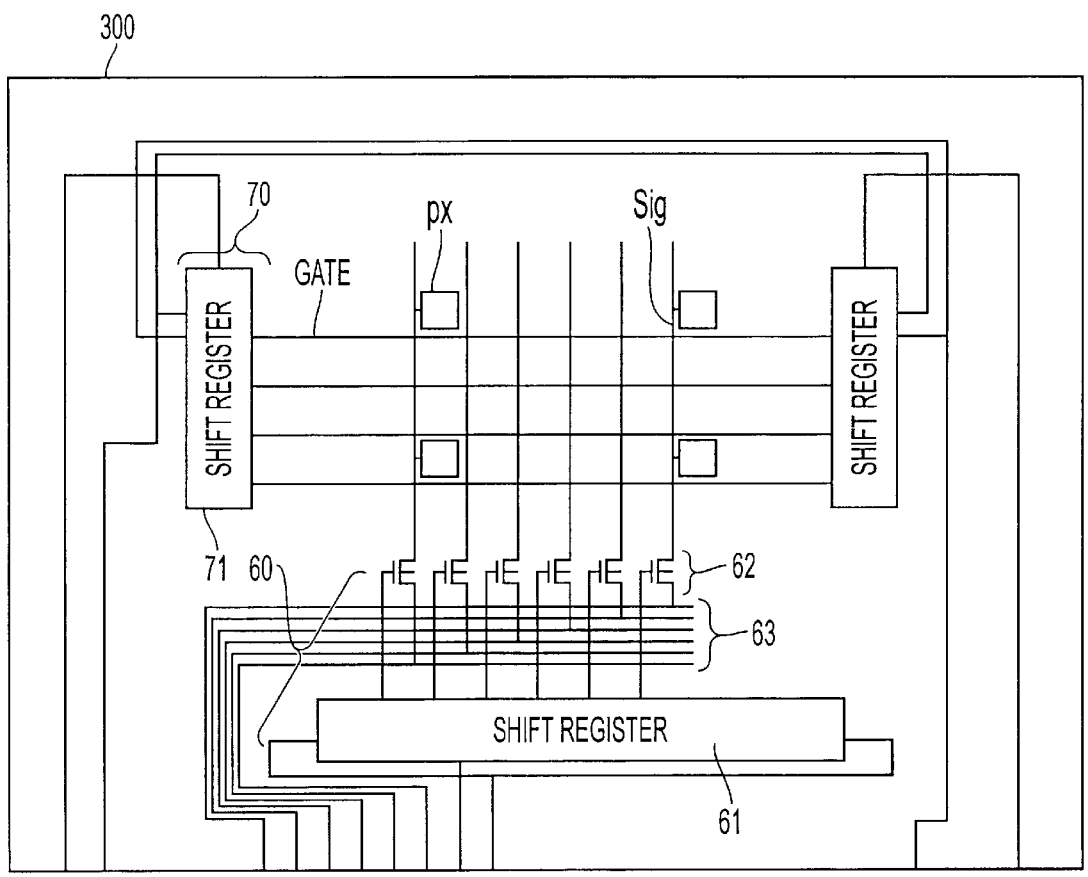
FIG. 5A is a block diagram of a second light-transmissive substrate used in the electrooptical device.

The structure of the active matrix substrate 300 used for such a liquid crystal panel 30, on which the driver ICs (the data-line driving circuit 60 and the scanning-line driving circuits 70) are mounted, is shown in FIG. 5A as a block diagram.

Figure 5B:
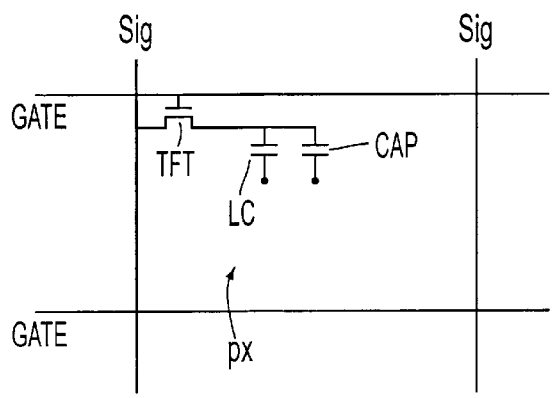
FIG. 5B is an enlarged block diagram of one of pixels arranged in a matrix on the second light-transmissive substrate.

As shown in FIG. 5A, a plurality of pixels "px" are formed in a matrix on the active matrix substrate 300 by scanning lines "gate" and a plurality of data lines "sig." In a region of each pixel px, a thin-film transistor TFT for pixel switching is formed to be connected to a scanning line "gate" and a data line "sig.", as shown in FIG. 5B in an enlarged view. A drain electrode of this thin-film transistor TFT is a pixel electrode in which a liquid crystal cell is formed by placing liquid crystal LC between the opposite electrode (FIG. 4B) of the aforesaid opposite substrate 400 and the pixel px. In the liquid crystal cell, a hold capacitor "cap" is formed by using the scanning line "gate" and a capacity line (not shown).

In the active matrix substrate 300, the data-line driving circuit 60 disposed on the periphery of the active matrix substrate 300 is an integrated circuit for supplying a plurality of data lines "sig" with an image signal, and the scanning-line driving circuits 70 are integrated circuits that include a shift register 71 for supplying a plurality of scanning lines "gate" with a scanning signal for image selection, and a buffer. The data-line driving circuit 60 includes an X-side shift register 61 to be supplied with a clock signal, a sample-and-hold circuit 62 for operating according to a signal output from the X-side shift register 61, and six image signal lines 63 corresponding to image signals that are expanded to six phases. For this reason, the sample-and-hold circuit 62 can operate according to a signal output from the X-side shift register 61, fetch an image signal supplied via the image signal line 63 into a data line "sig" at a predetermined timing, and supply the image signal to each pixel px.

Figure 6:
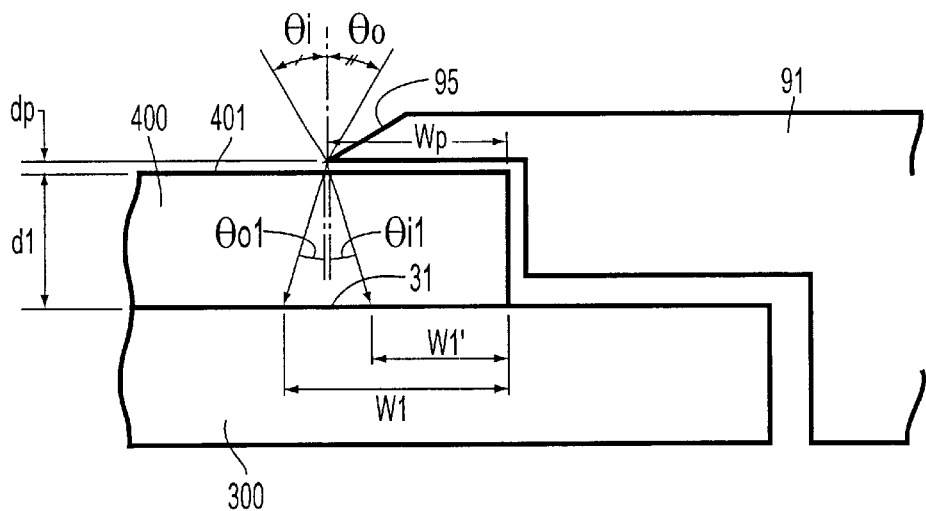
FIG. 6 is another enlarged view showing the principal part of the optical modulation device.

On the other hand, referring again to FIG. 4A, the holding member 90 of the optical modulation device 50 includes a frame 91 disposed on the light-incident side of the liquid crystal panel 30, and a hook 92 that is disposed on the light-emitting side of the liquid crystal panel 30 and is held by projections 91A of the frame 91. The frame 91 and the hook 92 hold the liquid crystal panel 30 therebetween. The frame 91 and the hook 92 have open portions 93 and 94 corresponding to the image area of the liquid crystal panel 30, respectively. In particular, a part around the open portion 93 of the frame 91 is formed by a cover portion 95 that faces a light-incident surface 401 of the opposite substrate 400. In this embodiment, as shown in FIG. 6, the cover portion 95 is shaped like a wedge having an acute tip that approaches the opposite substrate 400 according to be nearer to the inside (toward the image area).

C. Positional Relationship between Cover Portion and First Light-Shielding Portion in Optical Modulation Device In FIG. 6, the distance Wp from the end of the opposite substrate 400 to the inner peripheral edge of the cover portion 95 in the frame 91 (the distance in the in-plane direction of the opposite substrate 400) is set to be smaller than the distance W1 from the end of the opposite substrate 400 to the inner peripheral edge of the first light-shielding portion 31, as expressed by the equation (1) mentioned above.

More specifically, the distance Wp is set as follows.

That is, when the incident angle of incident light, which is incident from the inside of the inner peripheral edge of the cover portion 95, of light that is incident on the liquid crystal panel 30, is $\theta i$, the incident angle of incident light, which is incident from the outside of the inner peripheral edge, is $\theta o$, the distance between the inner peripheral edge of the cover portion 95 and the light-incident surface 401 of the opposite substrate 400 is dp, the thickness of the opposite substrate 400 is d1, the distance from the end of the opposite substrate 400 to the outer peripheral edge of the first light-shielding portion 31 is W1', and the refractive index of the opposite substrate 400 is n1, the distance Wp satisfies the following equation (11) so that the cover portion 95 does not block incident light from the outside, and satisfies the following equation (12), and also so that incident light from the inside does not leak from the outer peripheral edge of the first light-shielding portion 31. Therefore, the distance Wp satisfies an equation (13).

$$Wp \leq W1 - dp \tan\theta o - d1 \tan\theta o1 \quad (11)$$

$$Wp \geq W1' + dp \tan\theta i + d1 \tan\theta i1 \quad (12)$$

$$\therefore W1' + dp \tan\theta i + d1 \tan\theta i1 \leq Wp \leq W1 - dp \tan\theta o - d1 \tan\theta o1 \quad (13)$$

An equation (16) is obtained from the following general formulae (14) and (15). Similarly, an equation (19) is obtained from formulae (17) and (18).

$$\sin^2\theta o1 + \cos^2\theta o1 = 1 \quad (14)$$

$$\tan^2\theta o1 + 1 = \frac{1}{\cos^2\theta o1} \quad (15)$$

$$\therefore \tan^2\theta o1 = \frac{1}{\cos^2\theta o1} - 1 = \frac{\sin^2\theta o1}{1 - \sin^2\theta o1} \quad (16)$$

$$\sin^2\theta i1 + \cos^2\theta i1 = 1 \quad (17)$$

$$\tan^2\theta i1 + 1 = \frac{1}{\cos^2\theta i1} \quad (18)$$

$$\therefore \tan^2\theta i1 = \frac{1}{\cos^2\theta i1} - 1 = \frac{\sin^2\theta i1}{1 - \sin^2\theta i1} \quad (19)$$

Furthermore, equations (22) and (23) are obtained from the following other general formulae (20) and (21).

$$\sin\theta o = n1 \sin o1 \quad (20)$$

$$\sin\theta i = n1 \sin\theta i1 \quad (21)$$

$$\sin^2\theta o1 = \frac{\sin^2\theta o}{n1^2} \quad (22)$$

$$\sin^2\theta i1 = \frac{\sin^2\theta i}{n1^2} \quad (23)$$

The following equation (24) is obtained by substituting the equation (22) for the aforesaid equation (16) because $-90° < \theta o < 90°$ and $-90° < \theta i < 90°$. An equation (25) is obtained by substituting the equation (23) for the aforesaid equation (19). $\theta o$ and $\theta i$ are positive from the dotted chain line in the figure in the directions of the arrows, respectively.

$$\tan\theta o1 = \frac{\sin\theta o}{\sqrt{n1^2 - \sin^2\theta o}} \quad (24)$$

$$\tan\theta i1 = \frac{\sin\theta i}{\sqrt{n1^2 - \sin^2\theta i}} \quad (25)$$

By substituting these equations (24) and (25) for the equation (13), the aforesaid equation (2) is obtained. Therefore, the distance Wp is set within the range given by the equation (2).

This embodiment provides the following advantages.

Since the distance Wp from the end of the opposite substrate 400 to the inner peripheral edge of the cover portion 95 in the frame 91 is set to be smaller than the distance W1 from the end of the opposite substrate 400 to the inner peripheral edge of the first light-shielding portion 31, as expressed by the equation (1), it is possible to prevent the inner peripheral edge of the cover portion 95 from projecting into the image area beyond the first light-shielding portion 31. Since there is no fear that light incident from the outside of the inner peripheral edge of the cover portion 95 will be blocked by the cover portion 95, incident light can enter the entire image area, thereby preventing the peripheral portion of a projection image from becoming dark, and improving the quality of the projection image.

More specifically, since the distance Wp is set within the range given by the equation (2), there is no fear that incident light, which is incident from the outside at the incident angle $\theta o$, will be blocked by the frame 91. In addition, it is possible to prevent incident light, which is incident from the inside at the incident angle $\theta i$, from leaking from the outer peripheral edge of the first light-shielding portion 31, and to prevent light from being radiated onto the circuits 60 and 70 disposed on the periphery of the active matrix substrate 300, whereby malfunctions of these circuits can be avoided. With this, it is possible to prevent display shadows of the circuits 60 and 70 from being produced.

According to the equation (2), since there is no need to continuously form the first light-shielding portion 31 from the end of the opposite substrate 400 toward the image area, a light-transmissive portion corresponding to the distance W1' can be ensured between the end of the opposite substrate 400 and the outer peripheral edge of the first light-shielding portion 31. For this reason, it is possible to apply ultraviolet rays onto the sealing material 80 of the ultraviolet-curing type by using the light-transmissive portion, and to thereby bond the active matrix substrate 300 and the opposite substrate 400 more reliably.

2. Second Embodiment

Figure 7:
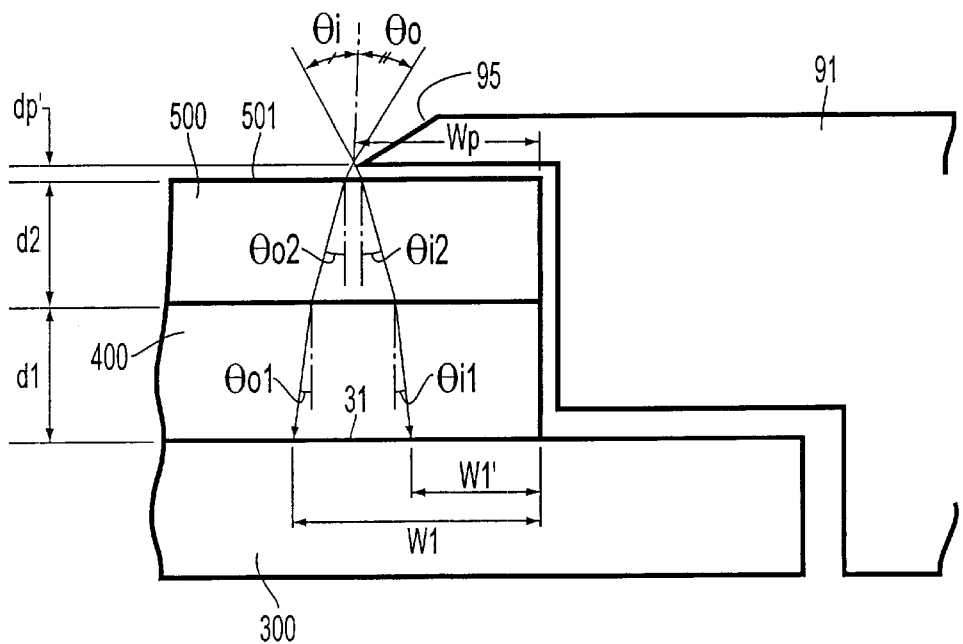
FIG. 7 is an enlarged view showing the principal part of an optical modulation device according to a second embodiment of the present invention.

FIG. 7 shows a positional relationship between a cover portion 95 and a first light-shielding portion 31 according to a second embodiment.

In this embodiment, a dustproof light-transmissive substrate 500 is disposed as a third light-transmissive substrate on the light-incident side of a opposite substrate 400, thereby protecting a light-incident surface 401 of the opposite substrate 400 from dust and flaws. The other structures are the same as those of the first embodiment.

In this embodiment, the distance Wp from the end of the opposite substrate 400 to the inner peripheral edge of the cover portion 95 of a frame 91 is set as follows.

That is, when the distance between the inner peripheral edge of the cover portion 95 and a light-incident surface 501 of the dustproof light-transmissive substrate 500 is dp', the thickness of the dustproof light-transmissive substrate 500 is d2, and the refractive index thereof is n2, the distance Wp satisfies the following equations (26) and (27), and therefore, satisfies an equation (28), in a manner similar to the first embodiment.

$$Wp \leq W1 - dp' \tan\theta o - d1 \tan\theta o1 - d2 \tan\theta o2 \qquad (26)$$

$$Wp \geq W1' + dp' \tan\theta i + d1 \tan\theta i1 + d2 \tan\theta i2 \qquad (27)$$

$$\therefore W1' + dp' \tan\theta i + d1 \tan\theta i1 + d2 \tan\theta i2 \leq Wp \leq W1 - dp' \tan\theta o - d1 \tan\theta o2 \tan\theta o2 \qquad (28)$$

Similar to the first embodiment, the following equations (29) to (32) are obtained from the general formulae:

$$\tan^2\theta o2 = \frac{\sin^2\theta o2}{1 - \sin^2\theta o2} \qquad (29)$$

$$\tan^2\theta i2 = \frac{\sin^2\theta i2}{1 - \sin^2\theta i2} \qquad (30)$$

$$\sin^2\theta o2 = \frac{\sin^2\theta o}{n2^2} \qquad (31)$$

$$\sin^2\theta i2 = \frac{\sin^2\theta i}{n2^2} \qquad (32)$$

Since $-90° < \theta o < 90°$ and $-90° < \theta i < 90°$, the following equation (33) is obtained by substituting the equation (31) for the equation (29), and an equation (34) is obtained by substituting the equation (32) for the equation (30).

$$\tan\theta o2 = \frac{\sin\theta o}{\sqrt{n2^2 - \sin^2\theta o}} \qquad (33)$$

$$\tan\theta i2 = \frac{\sin\theta i}{\sqrt{n2^2 - \sin^2\theta i}} \qquad (34)$$

By substituting these equations (33) and (34) and the aforesaid equations (24) and (25) for the equation (28), the aforesaid equation (3) is obtained. Therefore, the distance Wp is set within the range given by the equation (3). In some cases, the refractive index n2 of the dustproof light-transmissive substrate 500 is equal to the refractive index n1 of the opposite substrate 400.

This embodiment provides the following advantages because of the dustproof light-transmissive substrate 500 as well as the aforementioned advantages of the first embodiment.

Since the dustproof light-transmissive substrate 500 is disposed on the light-incident side of the opposite substrate 400, it is possible to protect the light-incident surface 401 of the opposite substrate 400 from dust and flaws, and to prevent the dust and flaws from being magnified and projected onto the projection screen. Moreover, since the light-incident surface 501 of the dustproof light-transmissive substrate 500 is apart from the liquid crystal panel 30, even when there are dust and flaws on the light-incident surface 501 of the dustproof light-transmissive substrate 500, such dust and flaws are out of focus, and there is no fear that they will be projected to deteriorate display quality.

3. Third Embodiment

Figure 8:
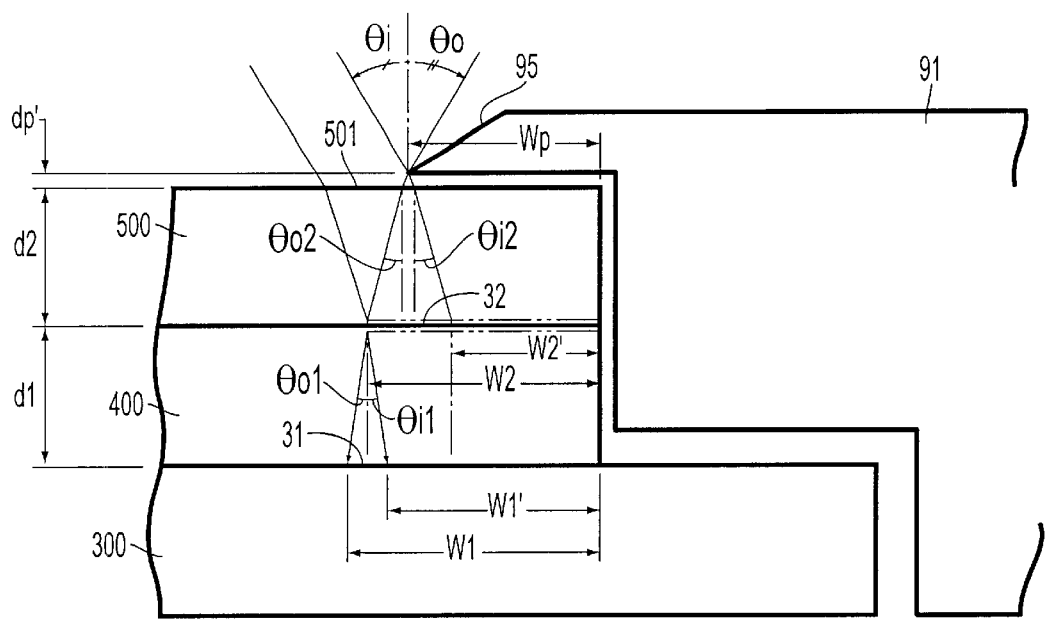
FIG. 8 is an enlarged view showing the principal part of an optical modulation device according to a third embodiment of the present invention.

FIG. 8 illustrates a third embodiment.

This embodiment differs from the above second embodiment in that a second light-shielding portion 32 is formed between a opposite substrate 400 and a dustproof light-transmissive substrate 500. Other structures are the same as those of the second embodiment.

In this embodiment, a distance W2 from the end of the opposite substrate 400 to the inner peripheral edge of the second light-shielding portion 32 is set to be larger than the aforesaid Wp and smaller than the aforesaid W1, as expressed by the equation (4) mentioned above.

More specifically, the distance Wp and the distance W2 are set as follows.

That is, when the distance from the end of the opposite substrate 400 to the outer peripheral edge of the second light-shielding portion 32 is W2', Wp satisfies the following equations (35) and (36), and therefore, satisfies an equation (37).

$$Wp \leq W2 - dp' \tan\theta o - d2 \tan\theta o2 \qquad (35)$$

$$Wp \geq W2' + dp' \tan\theta i + d2 \tan\theta i2 \qquad (36)$$

$$\therefore W2' + dp' \tan\theta i + d2 \tan\theta i2 \leq Wp \leq W2 - dp' \tan\theta o2 \qquad (37)$$

The aforesaid equation (5) is obtained by substituting the equations (24), (25), (33), and (34) for the equation (37). Therefore, the distance Wp is set within the range given by the equation (5).

On the other hand, the distance W2 between the end of the opposite substrate 400 and the inner peripheral edge of the second light-shielding portion 32 satisfies the following equation (38) so that incident light from the outside is not blocked with respect to a first light-shielding portion 31, and satisfies an equation (39) so that incident light from the inside does not leak from the outer peripheral edge of the first light-shielding portion 31. Therefore, the distance W2 satisfies an equation (40).

$$W2 \leq W1 - d1 \tan\theta o1 \qquad (38)$$

$$W2 \geq W1' + d1 \tan\theta i1 \qquad (39)$$

$$\therefore W1' + d1 \tan\theta i1 \leq W2 \leq W1 - d1 \tan\theta o1 \qquad (40)$$

By substituting the aforesaid equations (24), (25), (33), and (34) for the equation (40), the aforesaid equation (6) is obtained, and therefore, the distance W2 is set within the range given by the equation (6).

This embodiment provides the following advantages as well as the advantages of the first and second embodiments mentioned above.

Since the second light-shielding portion 32 is formed between the opposite substrate 400 and the dustproof light-transmissive substrate 500 and the distance W2 between the end of the opposite substrate 400 and the inner peripheral edge of the second light-shielding portion 32 is set within the range given by the equation (4), the second light-shielding portion 32 can block incident light from the inside that passes through the inner end of a cover portion 95. Therefore, in the case of the first light-shielding portion 31, there is no need to consider such incident light. Regarding incident light from the inside, consideration should be given to incident light that passes through the inner end of the second light-shielding portion 32. This makes it possible to increase the distance W1' between the end of the opposite substrate 400 and the outer peripheral edge of the first light-shielding portion 31. For this reason, more sealing material 80 (FIG. 4(B)) can be used by enlarging the light-transmissive portion of the opposite substrate 400, whereby the bonding strength and sealing properties between the active matrix substrate 300 and the opposite substrate 400 can be improved.

As the equations (5) and (6) reveal, the distance W2' between the end of the opposite substrate 400 and the outer peripheral edge of the second light-shielding portion 32 is required only to be set, in respect to a positional relationship to the distance Wp of the cover portion 95, so that light incident from the inside does not leak from the outer peripheral end of the second light-shielding portion 32. Therefore, under certain circumstances, the second light-shielding portion 32 may be formed over a wide area from the end of the opposite substrate 400 (a double-dotted chain line in FIG. 8), with W2' being set at zero. This makes it possible to more reliably prevent incident light from the inside from leaking toward the circuits 60 and 70.

4. Fourth Embodiment

Figure 9:
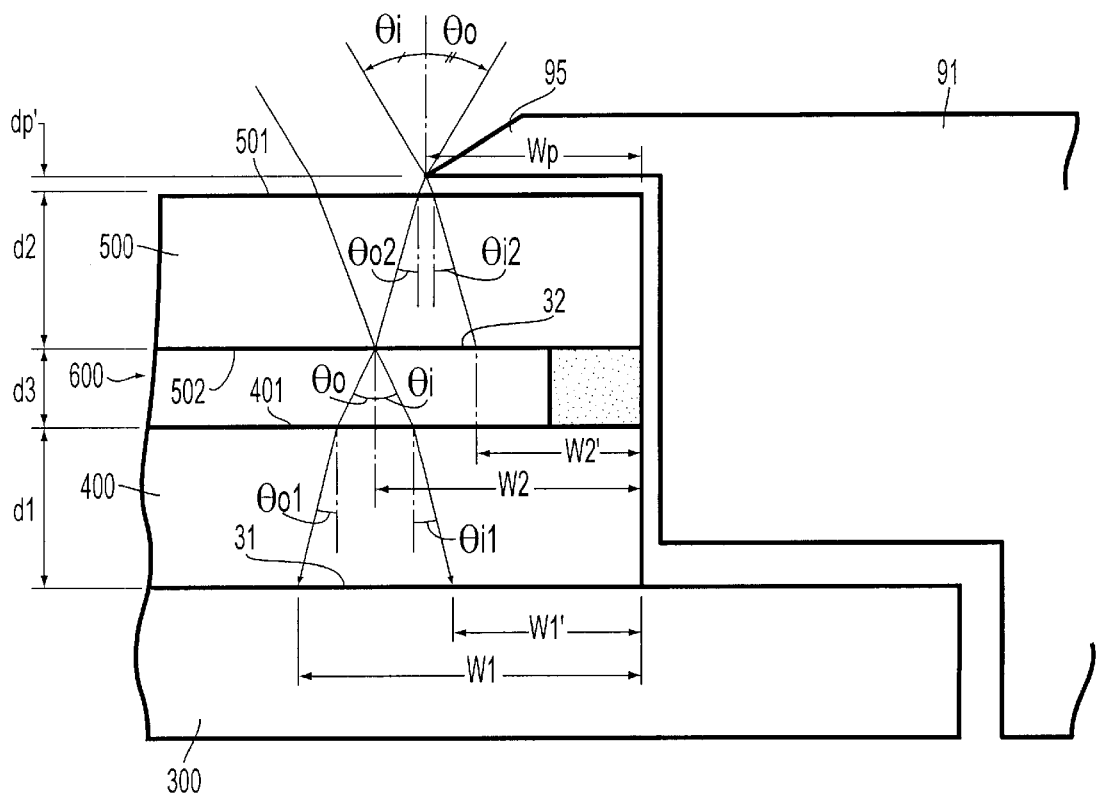
FIG. 9 is an enlarged view showing the principal part of an optical modulation device according to a fourth embodiment of the present invention.

FIG. 9 illustrates a fourth embodiment.

This embodiment differs from the aforesaid third embodiment in that an air layer 600 is formed between a opposite substrate 400 and a dustproof light-transmissive substrate 500 and that a second light-shielding portion 32 is formed on a light-emitting surface 502 of the dustproof light-transmissive substrate 500. Other structures are the same as those of the third embodiment.

The distance Wp in this embodiment is set within the range given by the aforesaid equation (7) (i.e., the equation (5)), similar to the third embodiment.

When the thickness of the air layer 600 is d3, the distance W2 satisfies the following equation (41). Since the aforesaid equation (8) is obtained by substituting the equations (24), (25), (33), and (34) for this equation (41), the distance W2 is set within the range given by the equation (8).

$$W1'+d1 \tan \theta i1 + d3 \tan \theta i \leq W2 \leq W1 - d1 \tan \theta o1 - d3 \tan \theta o \quad (41)$$

Such an embodiment can similarly obtain the advantages of the first to third embodiments, and also provides the following advantages.

Since the air layer 600 is formed between the opposite substrate 400 and the dustproof light-transmissive substrate 500, heat, which is generated in the dustproof light-transmissive substrate 500, is less prone to be transmitted to a liquid crystal panel 30, compared with the third embodiment in which the air layer 600 is not formed. For this reason, a temperature increase in the liquid crystal panel 30 is small, and the temperature increase does not occur locally. Therefore, it is possible to avoid variations in transmittance and deterioration of the liquid crystal LC that result from the temperature difference.

5. Fifth Embodiment

Figure 10:
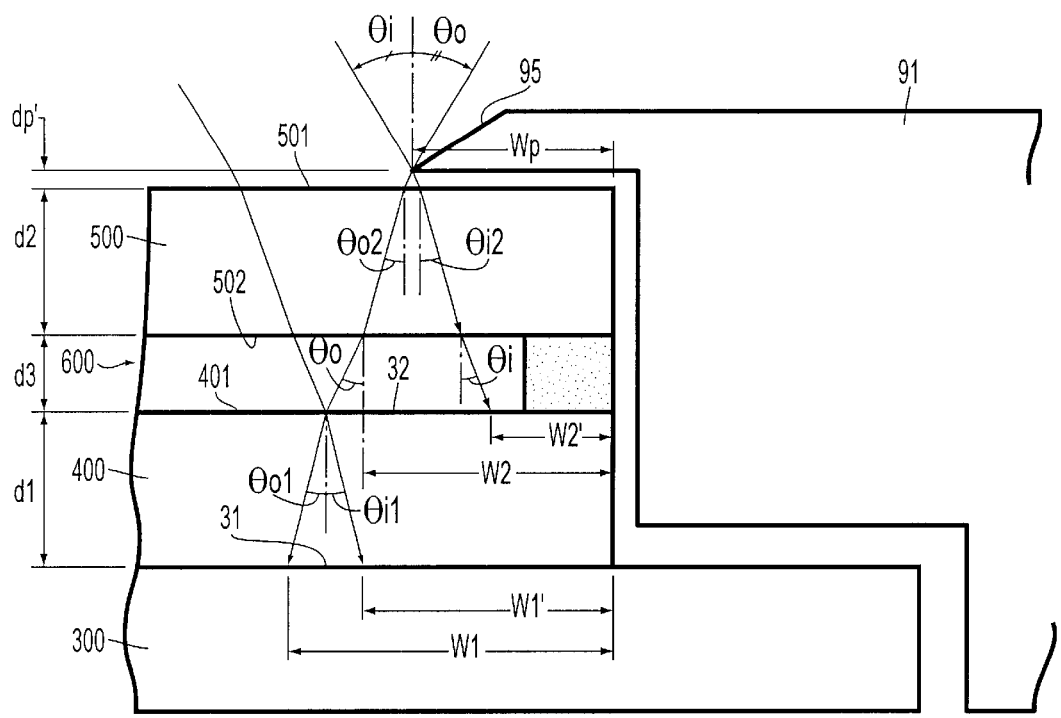
FIG. 10 is an enlarged view showing the principal part of an optical modulation device according to a fifth embodiment of the present invention.

FIG. 10 illustrates a fifth embodiment.

This embodiment differs from the aforesaid fourth embodiment in that a second light-shielding portion 32 is formed on a light-incident surface 401 of a opposite substrate 400. Other structures are the same as those of the fourth embodiment.

The distance Wp in this embodiment satisfies the following equation (42). Since the aforesaid equation (9) is obtained from this equation (42), the distance Wp is set within the range given by the equation (9).

$$W2'+(dp'+d3) \tan \theta o + d2 \tan \theta o2 \leq Wp \leq W2-(dp'+d3) \tan \theta o - d2 \tan \theta o2 \quad (42)$$

The distance W2 is set within the range given by the equation (10) (i.e., the equation (6)), similarly to the third embodiment.

According to this embodiment, advantages similar to those of the fourth embodiment can be obtained.

The present invention is not limited to the embodiments mentioned above. The invention covers other structures that can achieve the object of the invention, and the following modifications.

For example, while a space is formed between the cover portion 95 of the frame 91 and the light-incident surface 401 of the opposite substrate 400 or between the light-incident surfaces 401 and 501 of the dustproof light-transmissive substrate 500 in the above embodiments, the present invention also includes a case in which such a space is not formed. In this case, the distance Wp is set on the assumption that dp=dp'=0.

Figure 11:
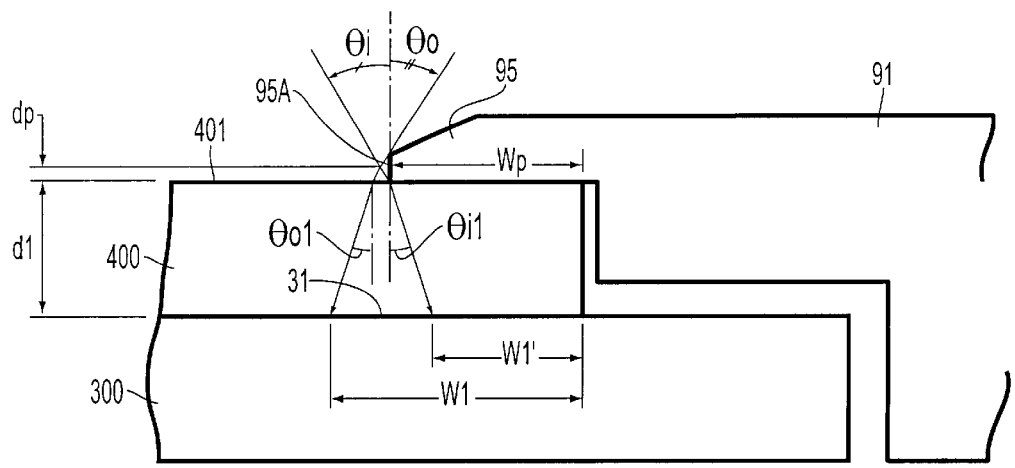
FIG. 11 is an enlarged view showing a variation of the present invention.

When there is no space between the cover portion 95 and the light-incident surface 401 and a step portion 95A is formed at the inner peripheral edge of the cover portion 95, as shown in FIG. 11, dp is set to be equal to 0 in the conditional equation relating to incident light from the inside. This also applies to a case in which the dustproof light-transmissive substrate 500 is used.

In short, the distances dp and dp' can be regarded as 0, in view of the shape of the cover portion 95 and the distance to the light-incident surface.

Furthermore, while the end of the opposite substrate 400 and the end of the dustproof light-transmissive substrate 500 are arranged flush with each other in the second to fifth embodiments (FIGS. 7 to 10), since the distances Wp, W1, W1', W2 and W2' of each of the sections are set with reference to the end of the opposite substrate 400, the end of the dustproof light-transmissive substrate 500 need not be flush with the end of the opposite substrate 400.

Furthermore, while what is called a front projection display device that performs projection from the side where a projected object is observed has been described in the above embodiments, the present invention may also be applied to a rear projection display device that performs projection from the side opposite to the side where a projected object is observed.

In addition, while what is called a transmissive electrooptical device, in which the light-incident surface and the light-emitting surface are different, has been used in the above embodiments, the electrooptical device of the present invention may be of what is called a reflective type. In this case, incident light is reflected by an active matrix substrate, and emitted from the light-incident surface. The electrooptical device may also be devices such as a PLZT panel and a device using a micro-mirror, other than a liquid crystal panel.

What is claimed is:

1. An optical modulation device, comprising:

an electrooptical device including a first light-transmissive substrate disposed on a light-incident side, a second light-transmissive substrate disposed on a light-emitting side, a sealing material that adheres first surfaces of said first and second light-transmissive substrates with a space there between, an electrooptical substance interposed between said first surfaces of said first and second light-transmissive substrates, and a driving circuit disposed at a peripheral edge of the first surface of said second light-transmissive substrate, and wherein said first and second light-transmissive substrates have second surfaces opposite to said first surfaces;

a holding member that holds said electrooptical device and has a cover portion that covers the peripheral edge of the second surface of said first light-transmissive substrate;

a first light-shielding portion formed on said first surface of said first light-transmissive substrate; and a relationship between Wp and W1 is expressed by an equation:

$$Wp < W1$$

Wp being the distance from an end of said first light-transmissive substrate to an inner peripheral edge of said cover portion in said holding member, and W1 being the distance from the end of said first light-transmissive substrate to an inner peripheral edge of said first light-shielding portion; and a relationship among Wp, W1, and a W1' is expressed by an equation:

$$W1' + dp\tan\theta i + d1 \frac{\sin\theta i}{\sqrt{n1^2 - \sin^2\theta i}} \le$$

$$Wp \le W1 - dp\tan\theta o - d1 \frac{\sin\theta o}{\sqrt{n1^2 - \sin^2\theta o}},$$

θi being an incident angle of incident light that is incident from the inside of the inner peripheral edge of said cover portion, θo being an incident angle of incident light, that is incident from outside of the inner peripheral edge of said cover portion, dp is a distance from the inner peripheral edge of said cover portion to said second surface of said first light-transmissive substrate, d1 is a thickness of said first light-transmissive substrate, W1' is a distance from the end of said first light-transmissive substrate to an outer peripheral edge of said first light-shielding portion, and n1 is a refractive index of said first light-transmissive substrate.

2. The optical modulation device according to claim 1, further comprising a third light-transmissive substrate formed between said first light-transmissive substrate and said cover portion, and a relationship among Wp, W1, and W1' is expressed by an equation:

$$W1' + dp'\tan\theta i + d1 \frac{\sin\theta i}{\sqrt{n1^2 - \sin^2\theta i}} + d2 \frac{\sin\theta i}{\sqrt{n2^2 - \sin^2\theta i}} \le$$

$$Wp \le W1 - dp'\tan\theta o - d1 \frac{\sin\theta o}{\sqrt{n1^2 - \sin^2\theta o}} - d2 \frac{\sin\theta o}{\sqrt{n2^2 - \sin^2\theta o}}$$

θi being an incident angle of incident light that is incident from inside of the inner peripheral edge of said cover portion, θo being an incident angle of incident light that is incident from outside of the inner peripheral edge of said cover portion, dp' is a distance from the inner peripheral edge of said cover portion to a light-incident surface of said third light-transmissive substrate, d1 is a thickness of said first light-transmissive substrate, d2 is a thickness of said third light-transmissive substrate, W1' is a distance from the end of said first light-transmissive substrate to an outer peripheral edge of said first light-shielding portion, and n1 and n2 are refractive indices of said first light-transmissive substrate and said third light-transmissive substrate.

3. The optical modulation device according to claim 2, further comprising a second light-shielding portion formed between said third light-transmissive substrate and said first light-transmissive substrate, and a relationship among Wp, W1, and W2 is expressed by an equation:

$$Wp < W2 < W1$$

where W2 is a distance from the end of said first light-transmissive substrate to an inner peripheral edge of said second light-shielding portion.

4. The optical modulation device according to claim 3, a relationship among Wp, W1, W1', W2, and W2' being expressed by equations:

$$W2' + dp'\tan\theta i + d2 \frac{\sin\theta i}{\sqrt{n2^2 - \sin^2\theta i}} \le$$

$$Wp \le W2 - dp'\tan\theta o - d2 \frac{\sin\theta o}{\sqrt{n2^2 - \sin^2\theta o}}$$

$$W1' + d1 \frac{\sin\theta i}{\sqrt{n1^2 - \sin^2\theta i}} \le W2 \le W1 - d1 \frac{\sin\theta o}{\sqrt{n1^2 - \sin^2\theta o}}$$

W2' being the distance from the end of said first light-transmissive substrate to an outer peripheral edge of said second light-shielding portion.

5. The optical modulation device according to claim 4, further comprising an air layer having a thickness d3 formed between said first light-transmissive substrate and said third light-transmissive substrate, said second light-shielding portion being formed on a light-emitting surface of said third light-transmissive substrate, and a relationship among Wp, W1, W1', W2, and W2' is expressed by equations:

$$W2' + dp'\tan\theta i + d2 \frac{\sin\theta i}{\sqrt{n2^2 - \sin^2\theta i}} \le$$

$$Wp \le W2 - dp'\tan\theta o - d2 \frac{\sin\theta o}{\sqrt{n2^2 - \sin^2\theta o}}$$

-continued $$W1' + d1\frac{\sin\theta i}{\sqrt{n1^2 - \sin^2\theta i}} + d3\tan\theta i \le$$

$$W2 \le W1 - d1\frac{\sin\theta o}{\sqrt{n1^2 - \sin^2\theta o}} - d3\tan\theta o.$$

6. The optical modulation device according to claim 4, further comprising an air layer having a thickness d3 formed between said first light-transmissive substrate and said third light-transmissive substrate, said second light-shielding portion being formed on said second surface of said first light-transmissive substrate, and a relationship among Wp, W1, W1', W2, and W2' is expressed by equations:

$$W2' + (dp' + d3)\tan\theta i + d2\frac{\sin\theta i}{\sqrt{n2^2 - \sin^2\theta i}} \le$$

$$Wp \le W2 - (dp' + d3)\tan\theta o - d2\frac{\sin\theta o}{\sqrt{n2^2 - \sin^2\theta o}}$$

$$W1' + d1\frac{\sin\theta i}{\sqrt{n1^2 - \sin^2\theta i}} \le W2 \le W1 - d1\frac{\sin\theta o}{\sqrt{n1^2 - \sin^2\theta o}}.$$

7. A projector comprising:
a light source;
an optical modulation device according to claim 1, and
a projection lens for projecting light modulated by said optical modulation device.

8. The projector according to claim 7, wherein a relationship among Wp, W1, and W1' is expressed by an equation:

$$W1' + dp\tan\theta i + d1\frac{\sin\theta i}{\sqrt{n1^2 - \sin^2\theta i}} \le$$

$$Wp \le W1 - dp\tan\theta o - d1\frac{\sin\theta o}{\sqrt{n1^2 - \sin^2\theta o}}$$

θi being an incident angle of incident light that is incident from the inside of the inner peripheral edge of said cover portion, θo being an incident angle of incident light, that is incident from outside of the inner peripheral edge of said cover portion, dp is a distance from the inner peripheral edge of said cover portion to said second surface of said first light-transmissive substrate, d1 is a thickness of said first light-transmissive substrate, W1' is a distance from the end of said first light-transmissive substrate to an outer peripheral edge of said first light-shielding portion, and n1 is a refractive index of said first light-transmissive substrate.

9. The projector according to claim 8, further comprising a second light-shielding portion formed between said third light-transmissive substrate and said first light-transmissive substrate, and a relationship among Wp, W1, and W2 is expressed by an equation:

$$Wp < W2 < W1$$

where W2 is a distance from the end of said first light-transmissive substrate to an inner peripheral edge of said second light-shielding portion.

10. The projector according to claim 10, a relationship among Wp, W1, W1', W2, and W2' being expressed by equations:

$$W2' + dp'\tan\theta i + d2\frac{\sin\theta i}{\sqrt{n2^2 - \sin^2\theta i}} \le$$

$$Wp \le W2 - dp'\tan\theta o - d2\frac{\sin\theta o}{\sqrt{n2^2 - \sin^2\theta o}}$$

$$W1' + d1\frac{\sin\theta i}{\sqrt{n1^2 - \sin^2\theta i}} \le W2 \le W1 - d1\frac{\sin\theta o}{\sqrt{n1^2 - \sin^2\theta o}}$$

W2' being the distance from the end of said first light-transmissive substrate to an outer peripheral edge of said second light-shielding portion.

11. The projector according to claim 10, further comprising an air layer having a thickness d3 formed between said first light-transmissive substrate and said third light-transmissive substrate, said second light-shielding portion being formed on a light-emitting surface of said third light-transmissive substrate, and a relationship among Wp, W1, W1', W2, and W2' is expressed by equations:

$$W2' + dp'\tan\theta i + d2\frac{\sin\theta i}{\sqrt{n2^2 - \sin^2\theta i}} \le$$

$$Wp \le W2 - dp'\tan\theta o - d2\frac{\sin\theta o}{\sqrt{n2^2 - \sin^2\theta o}}$$

$$W1' + d1\frac{\sin\theta i}{\sqrt{n1^2 - \sin^2\theta i}} + d3\tan\theta i \le$$

$$W2 \le W1 - d1\frac{\sin\theta o}{\sqrt{n1^2 - \sin^2\theta o}} - d3\tan\theta o.$$

12. The projector according to claim 10, further comprising an air layer having a thickness d3 formed between said first light-transmissive substrate and said third light-transmissive substrate, said second light-shielding portion being formed on said second surface of said first light-transmissive substrate, and a relationship among Wp, W1, W1', W2, and W2' is expressed by equations:

$$W2' + (dp' + d3)\tan\theta i + d2\frac{\sin\theta i}{\sqrt{n2^2 - \sin^2\theta i}} \le$$

$$Wp \le W2 - (dp' + d3)\tan\theta o - d2\frac{\sin\theta o}{\sqrt{n2^2 - \sin^2\theta o}}$$

$$W1' + d1\frac{\sin\theta i}{\sqrt{n1^2 - \sin^2\theta i}} \le W2 \le W1 - d1\frac{\sin\theta o}{\sqrt{n1^2 - \sin^2\theta o}}.$$

\* \* \* \* \*